United States Patent [19]
Schindlbauer et al.

[11] 3,859,335
[45] Jan. 7, 1975

[54] PROCESS FOR OBTAINING ESTERS FROM CYCLOHEXANONE WASTE

[75] Inventors: Hellmuth Schindlbauer, Maria Ensersdorf Suedstadt; Walter Eichberger, Perchtoldsdorf; Josef K. Brunner, Wien, all of Austria

[73] Assignee: ERZ and Stahl AG, Zurich, Switzerland

[22] Filed: June 21, 1973

[21] Appl. No.: 372,021

[30] Foreign Application Priority Data
June 22, 1972   Austria .............................. 5374/72

[52] U.S. Cl. ....... 260/484 R, 260/485 S, 260/488 F, 260/499, 260/540
[51] Int. Cl. ............................................ C07c 69/66
[58] Field of Search .............. 260/484 R, 485 S, 499

[56] References Cited
UNITED STATES PATENTS
3,524,892   8/1970   Horlenko et al. ................ 260/484 R Primary Examiner—Lorraine A. Weinberger
Assistant Examiner—Paul J. Killos
Attorney, Agent, or Firm—Flynn & Frishauf

[57] ABSTRACT

A process of obtaining esters from a waste salt solution from the production of cyclohexanone containing adipic acid, ε-hydroxycaproic acid, and monocarboxylic acids having chain lengths up to at least five carbon atoms, comprising acidifying the salt solution to form an aqueous phase and an organic phase containing the organic acids and separating said phases, esterifying the organic phase with a lower alcohol to form an ester mixture of the corresponding esters of the said organic acid components of said organic phase, separating from said ester mxiture, a mixture containing the esters of adipic acid and of ε-hydroxycaproic acid, and extracting with water the ester of ε-hydroxycaproic acid from the said mixture with adipate.

18 Claims, No Drawings

PROCESS FOR OBTAINING ESTERS FROM CYCLOHEXANONE WASTE

When cyclohexane is oxidized to form cyclohexanone, a process of great importance in the production of ε-caprolactam, a mixture of monocarboxylic and dicarboxylic acids formed by oxidative splitting of the alicyclic ring separates out in large quantity as a by-product.

In the process ordinarily used for oxidizing cyclohexane (Ullmann, 3d. ed., Vol. 5, p. 690), from 100 kg of cyclohexane, there is obtained about 70–80 kg of cyclohexanone as well as 20–25 kg of organic acids which are withdrawn from the process by an alkali wash as waste salt solution. This large proportion of waste salts is naturally a very heavy burden on the process, and there has been no lack of efforts to treat this solution in some way to obtain technically utilizable products. In fact, however, the waste salt solution is still evaporated and burned today, because up to now no other use could be found.

This burning operation is known to be uneconomic, because as the result of the low acid equivalents the fuel value of the salts is relatively small and a considerable portion of the heat obtained by the operation is used up evaporating the aqueous salt solution.

It is an object of this invention to provide a process for extracting salable materials from this oxanone-waste salt solution.

For every 100 kg of cyclohexane, the waste salt solution contains 5–8 kg of adipic acid, 6–7 kg of valeric acid and 5–6 kg of ε-hydroxycaproic acid, as well as smaller quantities of oxalic, formic and propionic, butyric, caproic, succinic and glutaric acids and some acid products of higher molecular weight. The importance of adipic acid as a component in polyamides, polyesters, lubricants and plasticizers has long been known. ε-hydroxycaproic acid has been the subject of many efforts aimed at its economic synthetic production, because its application as a starting material for the making of polyesters has been worked on for a long time.

An effective chemical treatment of this waste salt solution has therefore been the object of a great variety of experiments since the oxidation of cyclohexane has been practiced, in order to obtain economic utilization of these technically valuable acids.

It is thus proposed in the German Auslegeschrift (accepted patent application) No. 1,518,255 to obtain the dicarboxylic acids, particularly adipic acid, from the reaction mixture of the cyclohexane oxidation before the use of the alkali wash, by cooling the reaction mixture and separating the aqueous phase thus produced.

Another process for separating out the dicarboxylic acids is extraction with aqueous nitric acid from the cyclohexane oxidation reaction mixture, as described in U.S. Pat. No. 3,488,391.

While the processes mentioned above were concerned merely with a separation of the dicarboxylic acids from the oxidation mixture, in the German published patent application (Offenlegungsschrift) No. 2,025,089 a process is described for extraction of the waste wash solutions. This process succeeds in extracting the monocarboxylic, dicarboxylic and hydroxy organic acids contained in the wash solution by extraction with aliphatic or alicyclic alcohols, particularly with the first light fraction obtained from the distillation of the oxidation mixture.

All of these processes, however, are concerned only with separating out one or more components but not with their separation in sufficient purity as individual salable products.

The very many efforts to derive useful products from these waste salt solutions have been frustrated primarily by the ready condensability of ε-hydroxycaproic acid and other materials of higher molecular weight containing carboxyl and hydroxyl groups. These materials condense readily in the acid solution and under the application of heat. This application of heat, however, needs to be very high for the fractional distillation necessary for obtaining pure salable products. There are particularly high requirements for the purity of the acids for use as starting materials in the production of polymers. Other acids likewise can be sold as individual products only with the purity normally required for organic intermediates.

In accordance with the present invention, refining of the waste organic acids on an economic scale is effected by use of a particular combination of process steps to obtain the esters of the acids instead of the uncombined acids, and to obtain these not in strictly pure form but in particular mixtures, because in this procedure the condensation of the acids, if not fully prevented, can nevertheless be brought under control. The apparatus expense for obtaining salable products in this way is compensated by the high commercial value of the products obtained. It has been found that some esters produced by the process of this invention are usable solvents.

It is possible to work out the problems of the treatment process in such a manner that the condensed and condensable materials are drawn out of the system as soon as possible and so far as possible under cold rather than hot conditions. This step is usually frustrated by the incomplete and uneconomic separation of these materials. It has now been surprisingly discovered that by the combination of process steps according to the present invention, it is not necessary to prevent the condensation reaction and that, rather, it can to some extent provide an economic advantage.

The process of the present invention is a process for treatment of the waste salt solutions of the production of cyclohexanone characterized by the following sequence of steps: the separation of the waste salt solutions into an aqueous phase and an organic phase by acidifying and if necessary salting out, and esterification of the organic phase with a lower alcohol (preferably methanol), preferably after separation by distillation of a light water containing fraction, and then, after distilling off the solvent, separating from the remaining ester mixture a fraction that contains the esters of adipic and ε-hydroxycaproic acids, after which this fraction is separated into its components by extraction with water.

It is particularly favorable for the process if the salt solution which is the starting material has a density of about 1.16, because when the raw acids are separated by the use of sulphuric acid, it is then possible to obtain two well separated phases of, respectively, saturated sodium sulfate solution on the one hand, and a mixture of the organic acids still containing about 25–27 percent water, on the other hand, the so-called raw acid. This type of separation, on account of the high solubility of almost all the carboxylic acids in the raw acid, is the only possible way to separate the main bulk of the water from the acids. In the separation of the raw acid just described, the mixture warms up to about 60° C and carbon dioxide escapes as the result of the decomposition of formic and oxalic acids. The aqueous sodium sulfate solution that is formed, when the above given density of the starting solution is maintained, is practically saturated at a temperature of 60° C, which has the effect of confining the organic acids, down to a remainder content of 1 to 2 percent, into a phase of their own, the so-called raw acid.

It is easy to refine the sodium sulfate solution of a clean white product, sometimes after extraction of the remaining acids from the raw crystals with methanol or ethanol.

For the further refining of the raw acid, there are basically two methods. In the first of these, the aggregate of raw acids, if necessary after distilling off the water content, is esterified with methanol in the known esterification process, in the presence of ethylene chloride and an esterification catalyst, by boiling for 10 hours. The following disadvantages are to be noted as the result of the problems imposed by the necessity of distilling off water (water is formed in esterification):

In the first place, water can be distilled off only with a considerable content of monocarboxylic acids. In the second place, so much water remains behind that methylesterification proceeds slowly.

The second more favorable method of refining the raw acids, which is to be described below in detail, involves a thorough distilling off of water and all volatile acids up a temperature of about 110°-120° C in a vacuum of about 10 torr, and preferably about 10-12 mm Hg. In this manner it is possible to be sure of obtaining the dicarboxylic acids in water-free condition. Besides, the monocarboxylic acids that are distilled off are easier to esterify in spite of their water content, because they can easily be transesterified to the isobutyl ester, after which water can be removed by the extracting agent in the usual azeotropic esterification method.

The lower boiling monocarboxylic acid portion actually passes over together with the main bulk of the water. Two phases, however, form in this distillate. In the organic phase the acids are sufficiently free of water that they can be treated without difficulty by the above-mentioned azeotropic esterification process. The second phase contains only a little of the acids in great dilution. For increasing of the yield and for resolving the waste water pollution problem this aqueous phase can usefully be subjected to extraction with ethyl acetate in accordance with known procedures.

The formation of the methyl esters of the dicarboxylic acids proceeds very well in the extractive process utilizing in the usual way ethylene chloride or carbon tetrachloride or similar chlorinated hydrocarbons, even though during the course of the reaction no phase separation takes place. Here the condensation reaction of the hydroxy acids contained in the mixture, the reaction already mentioned in the introductory portions of this specification, has a favorable effect: the condensates, which are now present as esters, are energetically transesterified under the influence of an excess of methanol without splitting off water or an alcohol, more favorably than would be the case by the direct esterification of acids with splitting off of water. In fact, the residual acid content in the reaction mixture corresponds to a 95% transformation and the equilibrium that is set up, in dependence on the methanol excess, between methyl esters and condensation products can be clearly and unambiguously followed up by gas chromatography tests.

The refining of the reaction mixture produced by the above described methyl esterification of the dicarboxylic acids then begins with the neutralization with methanolic caustic potash of the strong acids that are present (sulfuric acid and acid catalyst). In this procedure no additional water is brought into the system and an eventual excess of KOH is buffered down by the residual organic acids still present, so that only salts catalytically inactive for transesterification are present.

The content of less volatile materials (chlorinated hydrocarbons and excess methanol) is now distilled off under a suitable vacuum under liquid pool temperatures not higher than 80° C and correspondingly good cooling. This precaution is necessary because a renewed formation of condensation products may occur as the result of lack of methanol. It has been found, however, that this undesirable effect can be prevented by suitable distillation procedure (short time of stay in the liquid pool, liquid pool temperature 55°-60° C).

All volatile esters are suitably distilled off in vacuum without fractionation out of the solvent-free mixture, in order to obtain products free of salts and tarry residues, after which the products are separated into the methyl esters of the respective acids that are present by means of a fractionating column with at least 20 theoretical plates and preferably about 30 plates separating the methyl esters of the monocarboxylic acids as well as the dimethyl esters of the dicarboxylic acids, including finally the separation as one fraction of the dimethyl ester of glutaric acid and as a second fraction a mixture of the dimethyl ester of adipic acid and the methyl ester of $\epsilon$-hydroxycaproic acid.

This fractionation is an important component of the process of the present invention, because from the high boiling fraction thus obtained the methyl ester of $\epsilon$-hydroxycaproic acid can be obtained in a good degree of purity in a simple fashion by a single-stage extraction with water. The water insoluble portion is then subjected to a further fractionation, as the result of which the collected dimethyl adipate is pure enough to serve as a starting material for the production of various lubricant esters of plasticizers. The water solubility of the methyl ester of $\epsilon$-hydroxycaproic acid and the marked water insolubility of the dimethyl ester of adipic acid together suggest that a simple mixture of the two esters could be separated by a water extraction. In fact, however, even with a six-stage extraction, that is only insufficiently accomplished, because the two esters act as solubilizing agents for each other. It has been found, however, that by using the described product of a prefractionation it is possible to separate by simple water extraction an excellent and useful methyl ester of $\epsilon$-hydroxycaproic acid and an easily purifiable dimethyl ester of adipic acid, which constitutes a decisive advantage of the process of the present invention. In the refining by distillation of all products, small amounts of condensation products still remain in the mother liquor, which can be recycled to the methyl esterification along with the mother liquor of the raw ester. It is desirable in that case, however, to draw out with water the accumulation of salts in the mother liquor, in order to prevent increasing their proportion in the reaction mixture. This procedure of recycled esterification of condensation products is made possible by the already mentioned equilibrium condition that depends upon the methanol content of the reaction mixture, and it naturally contributes materially to the economy of the process.

Another possibility for refining the reaction mixture produced by methyl esterification involves water extraction either immediately or after distilling off solvents. Neutralization then follows conveniently with aqueous alkali, particularly a soda solution, instead of with KOH in methanol. Low viscosity liquid products are then obtained by subsequent removal of the salts upon a following distillation. A considerable portion of the esters in this case go into the aqueous phase, which needs to be treated for their recovery. This extraction can be considered only in a limited way as a separation procedure regarding the individual esters. It does not avoid the necessity of the other extraction above mentioned following the separation of the methyl esters of the lower dicarboxy acids.

In principle, other variations of the combination of fractional distillation and extraction with water can be used for separation of the methyl esters. All of these combinations have in common, however, the circumstance that the extraction yields the desired hydroxycaproic acid ester in one stage if the material treated is a mixture obtained by prefractionating and consisting in large portion of ε-hydroxycaproic methyl ester, to a lesser extent of adipic dimethyl ester and in subordinate quantities of other esters.

EXAMPLE 1 a. 1,000g of waste salt solution having a density of 1.165 are slowly treated, under agitation, with 98 ml [(98 × 1.84) = 180g] of concentrated sulfuric acid (D = 1.84), as the result of which the pH of the solution drops below 3 and the mixture warms up to 60° C. Two phases are produced which are easily separated. The organic phase, the so-called raw acid, weighs 395–396g and contains all acids together with 25 – 27% water and some sodium sulfate.

b. 500g of the raw acid obtained by step (a) is subjected to distillation, in the course of which at first, up to 100° C at a pressure of 200 torr, water and water soluble monocarboxylic acids of low molecular weight (140g) pass over and thereafter, at 12 mm Hg up to 110° C the water-insoluble remaining monocarboxylic acids (60 – 65g) pass over.

c. The material left behind (about 290 – 300g) in the distillation of step (b) is mixed with 600g of ethylene chloride, 300g of methanol and 6g of p-toluolsulfonic acid and boiled with refluxing for 10 hours. The acid number falls during this treatment to 6–8 mg KOH/g, which corresponds to a residual acid content of 5%, thus a 95% conversion (esterification).

d. The reaction mixture obtained by step (c) is mixed with enough concentrated methanolic caustic potash (60 ml ln methanol.KOH) to neutralize the strong acids (sulfuric acid remainder and acid catalyst).

e. The reaction product of step (d) (about 1,250g) is now distilled to remove the solvent, the reaction water and the excess of methanol, without allowing the liquid from which these are distilled off to go above the temperature of 55°–60° C.

f. The liquid remaining after the distillation of step (e) (290-300g) is now distilled in vacuum over a still head at the lowest possible liquid pool temperature until, at a vacuum of 1 torr a still head temperature of about 125°–130° C is reached. At this point about 200g have passed over. The remainder (about 100g) becomes pasty on cooling and, after removal of the salts by aqueous extraction can again be esterified in accordance with step (c).

g. The distillate obtained in accordance with step (f) is fractionated in a column under a vacuum of 12 torr. During this operation, from 30° to 60° C 35 to 40g of the methyl esters of the remaining monocarboxylic acids pass over; from 70° to 100° C about 25g of the dimethyl ester of the dicarboxylic acids up to and including glutaric acid (with a slight content of the methyl ester of adipic acid) pass over, and from 105° to 125° C there passes over 110 to 120g of a mixture of the dimethyl ester of adipic acid and the ester of hydroxycaproic acid (with a small amount of the dimethyl ester of glutaric acid and the lower boiling condensation products). In the mother liquor there remain 20 to 30g of condensation products, that can then, without further treatment, be converted again in accordance with step (c) to monomeric esters.

h. The fraction passing over at 105°–125° C in step (g) is shaken with water in a ratio from 30:70 to 40:60. Two phases are formed, one of which comprises 80% of the mixture and contains, with water, the principal quantity of hydroxycaproic acid but little dimethyl ester of adipic acid or condensation products. After the separation of the organic phase and removal of the water by distilling it off, there remains about 60–65g that without further treatment can directly be used as a solvent. The other phase, the organic phase, contains adipic dimethyl ester and some hydroxycaproic methyl ester and condensation products, along with a little water. By a fractionation of this product about 50–55g of a very clean adipic acid ester is obtained, which is well suited for the production of plasticizers or lubricant esters. The last traces of ε-hydroxycaproic acid can be removed by boiling for 3 hours with 0.5–1% of an esterification catalyst, followed by distillative separation of the difficulty volatile condensation products that are formed.

i. The condensation products remaining in the mother liquor in steps (f), (g) and (h), when treated in accordance with step (c), yield about 60g more of monomer ester, which is added to the distillate obtained in step (f), and thus correspondingly increase the yield, particularly raising the hydroxycaproic acid content.

j. The monocarboxylic acids obtained in step (b) are converted with isobutanol to form 80–85g of isobutyl esters of monocarboxylic acids. The yield increases by 10–15% if the acids (10g) are extracted from the water distilled off from the raw acids, by means of a three-stage extraction with ethyl acetate.

EXAMPLE 2

The bulk of the water is distilled off over a column from the raw acids obtained in step (a) of Example 1. The remaining material is then treated in accordance with steps (c) to (i) of Example 1, in which case only 100 – 110g of methyl esters of monocarboxylic acids are obtained in the fractionation, which as needed can then be converted into the corresponding isobutyl ester with isobutanol and a transesterification catalyst.

EXAMPLE 3

The methyl esters (290 – 300g) contained in the material remaining after distillation in Example 1 after the performance of steps (a) through (e), in other words the starting material of step (f) of Example 1, is extracted in the cold state with 200 ml of water. Two phases are formed. The upper aqueous phase contains 220 – 225g and the lower phase 270 – 275g, the latter being substantially less viscous than before the extraction. The aqueous extract, after distilling off the water, consists of 10 – 12g of salts and 20 – 25g of methyl esters (especially methyl esters of the lower dicarboxylic acids and of hydroxycarboxylic acids). After filtration of the salts, these esters can either be added to the distillate of the organic phase and further refined as in steps (g) through (j) of Example 1, or else they can be separately fractionated and extracted with water and then added to the corresponding fractions of the remaining methyl esters. The latter procedure has the advantage that fractionation takes place with less separation expense, because a certain separation effect has already been accomplished by the water extraction.

EXAMPLE 4

The reaction mixture obtained in Example 1 after step (c), after cooling, is shaken with 600g of a water solution containing the necessary quantity of KOH for neutralization of the strong acids. The upper phase (750 – 780g) contains, in addition to water (including water produced by the reaction), methanol, all salts, the major portion of the unesterified acids (especially the dicarboxylic acids) and a portion of the esters, principally the dimethyl esters of the lower dicarboxylic acids and the hydroxycaproic methyl ester. The solvent is distilled off from the organic phase. Further refining treatment follows as in Example 3.

While methanol is the most preferred alcohol for use in the esterification of the organic phase according to the present invention, any other lower aliphatic alcohol having 1-6 carbon atoms may be used as for example, ethanol, propanol, isopropanol, butanol, isobutanol, tert.butanol, amyl alcohols, hexanol, cyclohexanol, etc., the primary alcohols being preferred.

We claim:

1. A process of obtaining esters from a mixture containing adipic acid, $\epsilon$-hydroxycaproic acid, and monocarboxylic acids having chain lengths up to at least five carbon atoms, comprising
   a. obtaining an acidic salt solution of said mixture,
   b. acidifying said salt solution to form an aqueous phase and an organic phase containing the organic acids and separating said phases,
   c. esterifying the organic phase with a lower alcohol to form an ester mixture of the corresponding esters of the said organic acid components of said organic phase,
   d. separating from said ester mixture, a mixture containing the esters of adipic acid and of $\epsilon$-hydroxycaproic acid, and
   e. extracting with water the ester of $\epsilon$-hydroxycaproic acid from the said mixture with the adipate.

2. The process of claim 1 wherein the acidification stage (b) is carried out by adding a strong mineral acid to said salt solution.

3. The process of claim 1 wherein the esterification stage (c) is carried out by adding methanol, a chlorinated hydrocarbon solvent, and an acid esterification catalyst.

4. The process of claim 1 wherein the organic phase separated from the acidified salt solution of stage (b) is distilled at a maximum temperature of about 120° C and at a pressure of about 10 torr whereby water and water soluble low molecular weight carboxylic acids are removed prior to the esterification stage (c).

5. The process of claim 1 wherein the esterified organic phase of stage (c) is distilled at a maximum vapor temperature of 60° C to remove solvent, water and excess methanol.

6. The process of claim 5 wherein the distillation residue after distillation to remove said solvent, water and methanol, is distilled in high vacuum at a maximum temperature of about 120° C and at a pressure of about 1 torr.

7. The process of claim 6 wherein the distillate is fractionated in column with at least 20 theoretical plates and at a pressure of from 10–20 torr to obtain a low temperature fraction, an intermediate fraction containing the diesters of the dicarboxylic acids up to and including glutaric acid, and a high temperature fraction containing the adipic acid diester and the ester $\epsilon$-hydroxycaproic acid.

8. The process of claim 7 wherein said high temperature fraction is washed with water to extract the ester of $\epsilon$-hydroxycaproic acid and wherein the non-water soluble remaining fraction is fractionated to obtain the pure adipate.

9. The process of claim 1 wherein the separation stage (d) is carried out by fractioning the ester mixture in a column with at least 20 theoretical plates and at a pressure of from 10–20 torr to obtain a low temperature fraction, an intermediate fraction, and a high temperature fraction containing the diester of adipic acid and the ester of $\epsilon$-hydroxycaproic acid.

10. A process for obtaining esters from the waste salt solution from the manufacture of cyclohexanone containing adipic acid, $\epsilon$-hydroxycaproic acid, valeric acid, and other carboxylic acids including monocarboxylic acids comprising
   a. acidifying said waste salt solution with a strong mineral acid to form an aqueous phase and an organic phase containing the organic acids, and separating said phases,
   b. distilling said organic phase at a temperature up to a maximum of about 110°–120° C at a vacuum of about 10 torr to distill off the water and any water-soluble low molecular weight carboxylic acids,
   c. esterifying the distillation residue of stage (b) by adding methanol, an acid esterification catalyst, and a chlorinated hydrocarbon solvent, and boiling,
   d. neutralizing the esterified reaction mixture of stage (c) by addition of a methanol-alkali metal hydroxide admixture,
   e. distilling while maintaining the liquid temperature below about 60° C the neutralized esterified reaction mixture of stage (f) to remove said solvent, water and excess methanol, leaving a residue containing the methyl esters of the organic acids including the methyl esters of adipic acid and of $\epsilon$-hydroxycaproic acid, and
   f. extracting with water said methyl ester of $\epsilon$-hydroxycaproic acid from admixture with the said methyl ester of adipic acid whereby the methyl ester of ε-hydroxycaproic acid enters the water phase.

11. The process of claim 10 wherein
g. said residue of stage (e) is distilled under vacuum leaving any remaining salts in a tarry residue,
h. fractionating the distillate of stage (g) under vacuum to obtain a low temperature fraction, an intermediate fraction containing the dimethyl esters of the dicarboxylic acids up to and including glutaric acid, and a high temperature fraction containing the dimethyl esters of adipic acid and of ε-hydroxycaproic acid,
i. extracting with water methyl ester of ε-hydroxycaproic acid from the high temperature fraction of stage (h), and
j. fractionating the portion of the high temperature fraction remaining after the water extraction of stage (i) to obtain pure dimethyl adipate.

12. The process of claim 11 wherein said strong mineral acid is sulfuric acid.

13. The process of claim 12 wherein the distillation of stage (g) at a maximum about 130° C at a pressure of about 1 torr.

14. The process of claim 12 wherein the fractionation of stage (h) is carried out in a column of at least 20 theoretical plates at a pressure of between about 10 and 20 torr.

15. The process of claim 14 wherein in said fractionating stage (h) the low temperature fraction is obtained at a temperature of between about 30° and 60° C; the intermediate fraction at a temperature of between about 70° C and 100° C; and the high temperature fraction at a temperature of between about 105° C and 125° C.

16. The process of claim 15 wherein said fractionation of stage (j) is carried out in a column having at least six theoretical plates.

17. The process of claim 16 wherein the fractionation of stage (h) is carried out in a column having at least 30 theoretical plates.

18. The process of claim 13 wherein said chlorinated hydrocarbon solvent is ethylene chloride.

* * * * *